US007697718B2

(12) United States Patent
Davis et al.

(10) Patent No.: US 7,697,718 B2
(45) Date of Patent: Apr. 13, 2010

(54) METHODS EMPLOYING TOPICAL SUBJECT CRITERIA IN VIDEO PROCESSING

(75) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 230 days.

(21) Appl. No.: 11/775,728

(22) Filed: Jul. 10, 2007

(65) Prior Publication Data

US 2008/0008351 A1   Jan. 10, 2008

Related U.S. Application Data

(62) Division of application No. 10/172,734, filed on Jun. 13, 2002, now Pat. No. 7,263,202.

(60) Provisional application No. 60/303,173, filed on Jul. 5, 2001.

(51) Int. Cl.
*G06K 9/00* (2006.01)
*H04N 7/173* (2006.01)

(52) U.S. Cl. .................. 382/100; 382/181; 725/86; 725/97

(58) Field of Classification Search ......... 348/460–468; 382/100–140, 181–231; 369/47.1, 47.12; 346/150.1, 137, 138; 725/86–90, 97, 227–230
See application file for complete search history.

(56) References Cited

U.S. PATENT DOCUMENTS

| | | |
|---|---|---|
| 3,729,581 A | 4/1973 | Anderson |
| 3,749,831 A | 7/1973 | Simpkins |
| 4,547,804 A | 10/1985 | Greenberg |
| 4,706,121 A | 11/1987 | Young |
| 4,945,412 A | 7/1990 | Kramer |
| 5,526,127 A | 6/1996 | Yonetani et al. |
| 5,559,548 A | 9/1996 | Davis et al. |
| 5,576,755 A | 11/1996 | Davis et al. |
| 5,585,866 A | 12/1996 | Miller et al. |
| 5,589,892 A | 12/1996 | Knee et al. |
| 5,627,655 A | 5/1997 | Okamoto et al. |
| 5,635,978 A | 6/1997 | Alten et al. |
| 5,781,246 A | 7/1998 | Alten et al. |
| 5,822,123 A | 10/1998 | Davis et al. |
| 5,841,978 A | 11/1998 | Rhoads |
| 5,893,095 A | 4/1999 | Jain et al. |
| 5,911,139 A | 6/1999 | Jain et al. |
| 5,913,205 A | 6/1999 | Jain et al. |
| 5,915,250 A | 6/1999 | Jain et al. |
| 5,956,455 A | 9/1999 | Hennig |
| 5,983,237 A | 11/1999 | Jain et al. |
| 5,986,650 A | 11/1999 | Ellis et al. |
| 6,016,141 A | 1/2000 | Knudson et al. |
| 6,118,492 A | 9/2000 | Milnes et al. |
| 6,118,923 A | 9/2000 | Rodriguez |
| 6,133,909 A | 10/2000 | Schein et al. |
| 6,141,488 A | 10/2000 | Knudson et al. |
| 6,144,401 A | 11/2000 | Casement et al. |
| 6,151,059 A | 11/2000 | Schein et al. |
| 6,167,188 A | 12/2000 | Young et al. |
| 6,173,112 B1 | 1/2001 | Gruse et al. |
| 6,177,931 B1 | 1/2001 | Alexander et al. |
| 6,215,526 B1 | 4/2001 | Barton et al. |
| 6,216,228 B1 | 4/2001 | Chapman et al. |
| 6,216,265 B1 | 4/2001 | Roop et al. |
| 6,233,389 B1 | 5/2001 | Barton et al. |
| 6,243,713 B1 | 6/2001 | Nelson et al. |
| 6,247,176 B1 | 6/2001 | Schein et al. |
| 6,275,268 B1 | 8/2001 | Ellis et al. |
| 6,275,648 B1 | 8/2001 | Knudson et al. |
| 6,278,446 B1 | 8/2001 | Liou et al. |
| 6,331,877 B1 | 12/2001 | Bennington et al. |
| 6,341,195 B1 | 1/2002 | Mankovitz et al. |
| 6,357,042 B2 | 3/2002 | Srinivasan et al. |
| 6,360,234 B2 | 3/2002 | Jain et al. |
| 6,373,960 B1 | 4/2002 | Conover et al. |
| 6,418,556 B1 | 7/2002 | Bennington et al. |
| 6,456,725 B1 | 9/2002 | Cox et al. |
| 6,463,444 B1 | 10/2002 | Jain et al. |
| 6,567,980 B1 | 5/2003 | Jain et al. |
| 6,604,240 B2 | 8/2003 | Ellis et al. |
| 6,701,369 B1 | 3/2004 | Philyaw |
| 6,738,100 B2 | 5/2004 | Hampapur et al. |
| 6,754,905 B2 | 6/2004 | Gordon et al. |
| 6,771,317 B2 | 8/2004 | Ellis et al. |
| 6,771,885 B1 | 8/2004 | Agnihotri et al. |
| 6,833,865 B1 | 12/2004 | Fuller et al. |
| 6,834,308 B1 | 12/2004 | Ikezoye et al. |
| 6,877,134 B1 | 4/2005 | Fuller et al. |
| 6,947,571 B1 | 9/2005 | Rhoads et al. |

(Continued)

OTHER PUBLICATIONS

Benitez et al, Object-Based Multimedia Content Description Schemes and Applications for MPEG-7, Signal Processing—Image Communication, vol. 16, Issues 1-2, Sep. 2000, pp. 235-269.

(Continued)

*Primary Examiner*—Manav Seth

(57) ABSTRACT

The picture information of video can be used in various ways to identify the video or its topical subject matter. This enables numerous novel arrangements in which particular video of interest to a particular consumer can be discerned. A variety of other embodiments and features are also detailed.

10 Claims, No Drawings

U.S. PATENT DOCUMENTS

| | | | |
|---|---|---|---|
| 7,020,351 | B1 | 3/2006 | Kumar et al. |
| 7,222,163 | B1 | 5/2007 | Girouard et al. |
| 2001/0021916 | A1 | 9/2001 | Takai |
| 2001/0026618 | A1 | 10/2001 | Van Wie et al. |
| 2001/0056577 | A1 | 12/2001 | Gordon et al. |
| 2002/0066111 | A1 | 5/2002 | Rodriguez |
| 2002/0073424 | A1 | 6/2002 | Ward, III et al. |
| 2002/0092017 | A1 | 7/2002 | Klosterman et al. |
| 2002/0120925 | A1 | 8/2002 | Logan |
| 2002/0124050 | A1 | 9/2002 | Middeljans |
| 2002/0144265 | A1 | 10/2002 | Connelly |
| 2002/0162118 | A1 | 10/2002 | Levy et al. |
| 2003/0093790 | A1 | 5/2003 | Logan et al. |
| 2005/0015802 | A1 | 1/2005 | Masson |

OTHER PUBLICATIONS

Chang et al, Multimedia Search and Retrieval, a chapter in Advances in Multimedia—Systems, Standards, and Networks, Puri ed., New York-Marcel Dekker, 1999, 28 pp.

Convera Case Studies—National Basketball Association, 2001.

Huang et al, Multimedia Search and Retrieval—new Concepts, System. Implementation, and Application, IEEE Trans on Circuits and Systems for Video Tech, vol. 10 No. 5, Aug 2000, pp. 679-692.

Kang et al, Multimedia database system with embedding MPEG-7 meta data, Proc SPIE, vol. 4311, 2001, pp. 187-197.

Langelaar, Watermarking Digital Image and Video Data, IEEE Signal Processing Magazine, Sep. 2000, pp. 20-46.

Marques, Content-Based Visual Information Retrieval, Ch 3 in Distributed Multimedia Databases, 2003, 22 pp.

Nack, Everything You Wanted to Know About MPEG-7—Part 2, IEEE Multimedia. vol. 6, No. 4, pp. 64-73. Oct. 1999, 10 pp.

Rehm, Representing Internet Streaming Media Metadata using MPEG-7 Multimedia Description Schemes, Proceedings of the 2000 ACM workshops on Multimedia, 2000, 6 pp.

Sikora, The MPEG-7 Visual Standard for Content Description-An Overview, IEEE Transactions on Circuits and Systems for Video Technology, vol. 11, No. 6, Jun. 2001, pp. 696-702.

Villegas et al, An Environment for Efficient Handling of Digital Assets, Proc. of Workshop on Image Analysis for Multimedia Interactive Services, WIAMIS 2003, Apr. 2003, London, 8 pp.

METHODS EMPLOYING TOPICAL SUBJECT CRITERIA IN VIDEO PROCESSING

RELATED APPLICATION DATA

This application is a division of copending application Ser. No. 10/172,734, filed Jun. 13, 2002, which claims priority benefit to provisional application 60/303,173, filed Jul. 5, 2001.

Filed on the same day as patent application Ser. No. 10/172,734 were two companion applications, both claiming priority benefit to application 60/303,173. These are application Ser. Nos. 10/172,735 and 10/172,733.

TECHNICAL FIELD

The present technology concerns use of consumer preference information in video processing.

BACKGROUND (Much of the disclosure from which the present claims are drawn is found towards the end of this specification.)

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. Nos. 6,122,403 and 6,408,082, and application Ser. No. 09/503,881, are illustrative of certain watermarking technologies. Watermarking techniques are also taught in the following Philips U.S. Pat. Nos. 6,252,972, 6,209,092, 6,198,832, 6,157,330, 6,131,161, 6,031,815, 5,940,134, 5,933,798, and 5,873,022.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 details a number of connected-content applications and techniques.

DETAILED DESCRIPTION

EPGs organize and present (e.g., by time or topic) upcoming video program content. As cable and satellite services increasingly have hundreds of channels, such guides become essential. EPGs are detailed in a variety of patents, including many assigned to Gemstar and StarSight, including U.S. Pat. Nos. 6,216,265, 6,118,492, 6,133,909, 6,144,401, 6,167,188, 6,247,176, 6,151,059.

In typical EPG systems, a service provider (e.g., TV Guide) collects programming information from national, network and local program sources, and compiles it into a database. The database is indexed by geography and delivery source (e.g., Portland Oreg.; AT&T Cable). Once a user's location and delivery source is known, the database can be queried to identify programming that is upcoming, e.g., for the next two hours. This data is typically presented in tabular (grid) form on the user's video screen. Advertising and other information may be presented with the EPG data on the screen.

EPG data is presently conveyed to the consumer for display on-screen through "out-of-band" techniques, such as the vertical blanking interval in analog video. Some systems have dedicated channels through which such data is presented.

One drawback of such systems is their reliance on time-of-day as the key by which program schedules are determined. If a sports game runs late, or if breaking news forces an interruption in normal programming, the EPG does not reflect the change.

In accordance with one aspect, watermark data identifying a program is decoded from incoming video. This information is then checked against program identification data in the EPG and, if a discrepancy is noted, then a change in the programming is indicated on the displayed EPG. Consider Superbowl Sunday. The EPG database may indicate that a SuperBowl broadcast on channel 2 is scheduled to end at 5:00 p.m. At 5:15, a watermark is decoded from channel 2 and conveys an identifier associated with the SuperBowl, indicating that the SuperBowl program has run past its originally-allotted time. The EPG can update its entry for the Superbowl, extending its ending time to 5:15 (the current time), 5:30 (the next half-hourly interval), or otherwise mark it as changed. Data for subsequent programming on that channel can likewise be treated as changed (e.g., by pushing back all programming 15 minutes, or to the next half-hourly interval, or otherwise), and displayed in the EPG accordingly.

Continuing this scenario, assume the SuperBowl broadcast ends at 5:20. This ending time can be detected by failure to detect the SuperBowl-identifying watermark from program material on channel 2 for a predetermined interval, such as 5 minutes. At 5:30, a new watermark ID is detected—this one corresponding to the program originally scheduled for broadcast at 5:00. In this case, the database can shift by 30 minutes the expected times of the 5:00 program, to 5:30. Viewers who refer to the EPG at 5:35 will thus be presented with a timetable that accurately reflects the currently available programs.

The expected timing of future programs can also be shifted in the EPG database and display, with the service provider deciding how far out in time to continue this shift. Certainly by midnight, for example, the programming would be expected to return to its originally scheduled timing, with some compensating program change (e.g., an abbreviation of the evening news) making up for the SuperBowl overrun.

In some embodiments, the EPG interface presented to the user indicates that programming times for a particular channel are uncertain. In the example just given, for example, a graphical display of a program grid for channel 2 may be highlighted in yellow from 6:00 p.m. until midnight, indicating that a change has made precise air-times uncertain. As each half-hourly slot arrives, however, the detection of a watermark from the video then being sent permits at least the currently-available programming to be accurately displayed. (Of course, a variety of other techniques can be used to indicate schedule uncertainty, other than yellow highlighting. Distinctive text presentation within the grid (e.g., italics), special effects (e.g., flashing text or background color), textual alert messages, and a great variety of other arrangements can be used to alert the viewer to the uncertainty.)

In addition to indicating uncertainty in the program schedule, the EPG presentation can also be altered to indicate that program times have been shifted from their expected values (i.e., certain times, but different). Again, a variety of user interface techniques can be used to signal this fact to viewers (including techniques detailed above).

Many VCRs, and essentially all Personal Video Recorders (PVRs), rely on EPG data to set start and stop times for recording functions. These devices can respond to watermarks, and/or EPG information that is updated by reference to watermarks, to capture the desired program—regardless of program delays.

Assume that the 5:00 program following the SuperBowl on channel 2 is Seinfeld, and the user has earlier specified that Seinfeld (30 minutes) should be recorded. At 5:00, the recording commences. Soon, however, the watermark data reveals that Seinfeld isn't yet playing. Out of abundance of caution, the device may continue to record. Or it may stop after, e.g., a five minute grace period, and try again, re-starting at the next half-hourly interval. Or, after stopping, it may immediately resuming recording if a Seinfeld watermark is detected between 5:05 and 5:30.

If the device does not stop, but records continuously from 5:00 onward, it may continue until 30 minutes after a Seinfeld-identifying watermark is first identified. Thus, if Seinfeld starts at 5:20, the device will continue to record until 5:50 (and optionally for a brief interval after that time). If a Seinfeld watermark isn't detected within a predetermined window, e.g., 90 minutes, of the expected air-time, the recording device may conclude that the Seinfeld broadcast has been canceled (avoiding recording of hours of unwanted programming).

In other embodiments, the stop time for a recording isn't set by reference to EPG data, or by reference to a known interval (e.g., 30 minutes) after a start time. Instead, the device stops only when a watermark identifying a desired program is no longer detected. (Here, as elsewhere, "no longer detected" typically requires absence of detection for a period of several minutes, to account for commercials and other interruptions that may not convey the watermark of the desired program.)

If the recording device began recording at 5:00, it captured part of the Superbowl broadcast. Rather than save this unwanted program material, it may be deleted. In PVRs, and other devices with digital storage, the storage space allocated to the unwanted programming can simply be marked as unused by the desired program, and returned to the pool of available storage. In one such embodiment, recorded programming is discarded until a time a predetermined interval (e.g., 90 seconds) before first detection of the Seinfeld-identifying watermark.

In other arrangements, instead of deleting the non-Seinfeld program, it may be retained in storage. By reference to the updated EPG data, or the watermark, the unwanted programming can be identified as the end of the Superbowl. This information can be logged in the device's index of recorded material, together with an identification of its length, and optionally the start and stop times of the original broadcast. (Other information, such as the location of the Superbowl video data in the device's file structure can also be maintained, but such information is typically transparent to the user.) When a table of recorded contents is presented to the user on-screen, the Superbowl excerpt can be included among the listings—possibly set-off by distinctive UI presentation to indicate that it was an unintended capture. When the user is first presented with this unintended program capture, the system may ask the user whether it should be retained or deleted. The system may have a default option, e.g., that unless the user acts to preserve the accidentally-captured video, it is deleted.

In tape-based systems, if recording started at 5:00, and at 5:25 the watermark corresponding to the recorded program still indicates a non-Seinfeld program, the tape may be automatically rewound to the point where the 5:00 recording commenced. Then, at 5:30, recording can commence anew, on the possibility that Seinfeld has been shifted to the next half-hourly slot and will be properly captured by recording from 5:30 to 6:00.

Apart from accurately presenting program information, and correctly recording desired programs, watermarking can be employed in connection content security and authentication. Consider the delivery of Pay Per View (PPV) content. The PPV content may have usage rules associated with it. These rules may, e.g., disallow recording, or fast forwarding, or rewinding, or pausing, etc. These usage restrictions may be conveyed by out-of-band or virtual channels, such as data transmitted prior to the video program, or during the vertical blanking interval, or in packet headers. In accordance with certain embodiments, watermarks are used to represent this information.

For example, a video signal can include a watermark with an eight bit payload. The first bit, if set to "1," can indicate no copying. The second bit, if set to "1," can indicate one copy permitted. The third bit, if set, can indicate pausing is permitted. The fourth bit can correspond to rewind permission, the fifth to fast forward permission, the sixth can indicate that any copy must be made on a certain type of medium (e.g., a local PVR), the seventh can indicate that any copy must be stored in encrypted form, etc. (If copy-once is permitted, the video can be modified during the permitted copying operation to signal that no-more-copies are authorized. This may be done, e.g., by applying a further watermark to the signal.)

In still other embodiments, watermarks can be used in bandwidth optimization strategies to provide augmented information, or programming, to a consumer. Consider a consumer who is interested in motorcycling. This preference may have been specified explicitly by the consumer, or may have been inferred through his behavior (e.g., his observed history of linking to on-line resources relating to motorcycles). The topic of motorcycling may correspond to a particular 16 bit identifier in a subject matter index (allowing 64 thousand subjects). During hours when the PVR is not being actively used, it may scan through all channels looking for material that is coded with the motorcycle subject code (perhaps among several others). If such material is encountered, it is recorded, and a corresponding entry is made in the PVR's local table of contents. When the consumer next uses the device, he can see that a program of potential interest has been recorded.

The same technology can be used with advertising. Advertising can be topically coded to identify the subject matter. If advertising is encountered having the motorcycle subject code, it can be captured and locally stored for possible later display. In this case, the presentation of the advertising can be requested by the user (as with any other recorded program), or the captured advertisement can be inserted in a commercial slot in other video programming (perhaps supplanting another commercial that is not as likely to capture the consumer's interest).

Such encoding of video content with subject-indicating codes is limited by factors such as lengths of the codes, robustness to compression/decompression and other distortion, video degradation, and other factors. In one system, a watermark with an 80 bit payload can be encoded in video, permitting recovery of 5 different content codes every, e.g., 30 seconds. The same content codes can be repeated every 30 seconds. Or, by repeating them less frequently, more codes can be conveyed (e.g., codes 1-5 in time 0-30 seconds; codes 6-10 in time 30-60 seconds, codes 1-5 in time 60-90 seconds, etc.). Of course, this watermark may be overlaid or interleaved together with other watermarks conveying other information.

Instead of conveying absolute subject matter codes, each video excerpt can convey a unique ID that is used to access associated meta data in a data store. The data store may be local (e.g., downloaded to a set-top box periodically), or remote (e.g., at a cable head-end or elsewhere). Thus, a Seinfeld program may have a single code. But when that code is used to access a corresponding database record with meta data, the record may reveal 10 subject matter codes (e.g., comedy, New York City, Jerry Seinfeld, motorcycling, episode 29, episode title, etc.).

Different subject codes (or unique IDs) can be used for different portions of a video program. So a ninety second clip that relates to a motorcycle may be coded to identify this subject matter, without so-coding the remainder of a program. The different portions need not be just temporal portions. Through object segmentation technology, such as is used in MPEG-4, different on-screen objects can be encoded with different watermark identifiers. Thus, a motorcycle in that ninety second clip may be encoded with a watermark indicating its motorcycle subject matter, while a BMW automobile in the same scene may be encoded with a different watermark.

In monitoring program material for desired codes, the consumer device can have a buffer in which the previous 15 seconds of video is always available. Thus, if a desired watermark is detected, video from 15 seconds prior to the detection can be written to long-term storage—to account for possible latency in watermark detection.

In a typical scenario, there may be 100 subject codes for which a consumer's PVR is watching corresponding to 100 subjects of potential interest to the consumer. As each watermark is detected, it is checked against this list and, if a match is found, the video is captured (including the buffered 15 seconds prior to detection) for later display. If the program material is watermarked with unique IDs instead of literal subject matter codes, the consumer device can query a database for the corresponding subject matter codes, and record the content if a match with one of the 100 profiled subject matter codes is found. In some embodiments the database is maintained remotely, introducing a delay as the decoded codes are sent to the data, and the results relayed back. Other approaches can mitigate this delay. For example, some (or all) of the database can be cached at the consumer premises. Another approach is for the consumer device to periodically send its 100 searched-for subject matter codes to the database, which then returns a list of the Unique ID records for which the consumer device should be on the lookout (i.e., those having the subject matter codes that are searched for).

The watermark detection functions referenced above can take place at various different locations. In some embodiments, detection may take place at a device in the consumer home, such as in one or more of a set-top box, VCR, PVR, television monitor, etc. Information from such detection, in some embodiments, may be related back up the chain of distribution (e.g., a neighborhood distribution node, cable head-end, cable control center, national EPG database provider, etc.) Or the detection can take place at any of the upstream locations. For example, a station through which all AT&T Cable signals destined for subscribers in Multnomah and Clackamas counties in Oregon can monitor all those channels.

In some applications, it is desirable to employ the watermark-based systems detailed above in connection with known prior art techniques. PPV usage data, for example, can be conveyed both in header data associated with encrypted content, as well as by watermark data. One data can be relied upon primarily (e.g., the header data) and, if absent or apparently corrupted, the watermark information can be relied upon instead.

As should be evident from the foregoing, certain embodiments contemplate that a unique watermark identifier is associated with each video program. The identifier may be generic to a class of programs (e.g., all Seinfeld shows are identified by the same watermark), or each different program may have a different ID. In the latter case, the watermark payload may have plural portions. One portion may ID a family of programs (e.g., Seinfeld episodes), and another portion may convey an ID uniquely identifying a particular program in that family (e.g., episode 88, "The Big Salad").

The watermark identifier can be used to access a corresponding database record where information about the identified program is stored. It may include the date the program was first broadcast (e.g., "Sep. 29, 1994"), a synopsis of the program (e.g., "Jerry dates Newman's ex. George buys Elaine a big salad from the coffee shop, when his girlfriend takes credit for buying it. George lets Elaine know that it was him that bought that salad. Show ends with Kramer driving Gendison's white Ford Bronco down the interstate (ala OJ)"), rights-holder information, digital rights management information, copy control information, links to related programs, links to related merchandise, links to on-line resources including chat rooms and program archives, subject matter classification codes, etc. This database may be stored remotely from the user station, and remotely accessed by the user as necessary. Or some or all of the database and contents can be kept (or mirrored) in a data store at the user's premises (e.g., in a set top box). Such a database can be configured in accordance with a user profile, e.g., specifying the class of programs to be detailed in the local database. Or the remote database can provide the local database with information corresponding to watermark IDs expected to be encountered in the next 7 days (e.g., during early morning hours when system traffic is otherwise low). A local user database can include information provided by the user and not shared with a remote database, including private notes about likes/dislikes, etc. Or information provided by the user (including demographics and viewing habits) can be passed to a remote database. Such personal information in the remote database can be shared with other users, with a cable system operator, with the provider of the annotated database record, etc. The user may receive a fee in some circumstances for sharing such information.

To provide a comprehensive disclosure without unduly lengthening this specification, the patents and applications cited above are incorporated herein by reference.

Having described and illustrated the subject technologies with reference to illustrative embodiments, it should be recognized that the invention is not so limited. For example, it will be recognized that the concepts detailed above can be implemented with various forms of watermarking technologies, and can be advantageously combined in straight-forward fashion with other content-delivery systems. Moreover, it will be recognized that wherever in the prior art that vertical blanking interval-based data communications techniques were used, the same applications may be served instead by conveying such data through in-band video watermarking. Further, it should be recognized that the particular combinations of elements and features in the above-detailed embodiments are exemplary only; the interchanging and substitution of these teachings with other teachings in this and the incorporated-by-reference materials are also contemplated.

We claim:

1. At a consumer electronic device, a method comprising the acts:
   processing a feed of video content, said processing including discerning a unique identifier that changes during the course of said video feed, the discerning thereby yielding a series of unique identifiers;
   comparing said series of unique identifiers against a set of reference data, said set of reference data comprising unique identifiers corresponding to video content meeting one or more desired topical subject matter criteria; and
   if one of said unique identifiers is found to have a counterpart in the set of reference data, then taking an action.

2. At a consumer electronic device, a method comprising the acts:
   processing a feed of video content, said processing including discerning a unique identifier that changes during the course of said video feed, the discerning thereby yielding a series of unique identifiers;
   comparing said series of unique identifiers against a set of reference data, said set of reference data comprising unique identifiers corresponding to video content meeting one or more desired topical subject matter criteria; and
   if one of said unique identifiers is found to have a counterpart in the set of reference data, then taking an action; the method further including:
   receiving information from a consumer indicating one or more desired topical subject matter criteria;
   consulting a data structure to identify unique identifiers corresponding to video content meeting said desired topical subject matter criteria; and
   storing said identified unique identifiers in said set of reference data for later comparison against said discerned series of unique identifiers.

3. The method of claim 1 wherein said unique identifier changes during the course of a single video program, so that a single video program yields a series of unique identifiers.

4. The method of claim 1 wherein said discerning comprises extracting said unique identifiers from picture data to be rendered to a consumer.

5. At a consumer electronic device, a method comprising the acts:
   processing a feed of video content, said processing including discerning a unique identifier that changes during the course of said video feed, the discerning thereby yielding a series of unique identifiers;
   comparing said series of unique identifiers against a set of reference data, said set of reference data comprising unique identifiers corresponding to video content meeting one or more desired topical subject matter criteria; and
   if one of said unique identifiers is found to have a counterpart in the set of reference data, then taking an action;
   wherein said discerning comprises extracting said unique identifiers from picture data to be rendered to a consumer, said discerning comprises discerning digital watermarks with which the picture data has been encoded.

6. At a consumer electronic device, a method comprising the acts:
   processing a feed of video content, said processing including discerning a unique identifier that changes during the course of said video feed, the discerning thereby yielding a series of unique identifiers;
   comparing said series of unique identifiers against a set of reference data, said set of reference data comprising unique identifiers corresponding to video content meeting one or more desired topical subject matter criteria; and
   if one of said unique identifiers is found to have a counterpart in the set of reference data, then taking an action;
   wherein the feed of video content includes first and second segmented video objects, and said discerning comprises discerning first and second digital watermarks with which said objects have been respectively encoded, said watermarks comprising said unique identifiers.

7. At a consumer electronic device, a method comprising the acts:
   processing a feed of video content, said processing including discerning a unique identifier that changes during the course of said video feed, the discerning thereby yielding a series of unique identifiers;
   comparing said series of unique identifiers against a set of reference data, said set of reference data comprising unique identifiers corresponding to video content meeting one or more desired topical subject matter criteria; and
   if one of said unique identifiers is found to have a counterpart in the set of reference data, then taking an action; wherein:
   the feed of video includes a first portion meeting said desired topical subject matter criteria, and a second portion not meeting said desired subject matter criteria, the first portion having an uncertain stopping or ending point; and
   said action comprises presenting said first portion for viewing by a consumer, together with part—but not all—of an adjoining second portion.

8. A method comprising the acts:
   receiving information identifying plural topical subjects of interest to a consumer;
   processing a feed of video content, said processing including discerning a unique identifier that changes during the course of said video feed, the discerning thereby yielding a series of unique identifiers;
   checking said series of unique identifiers in a data store that associates unique identifiers with one or more topical descriptors related to the video identified by said identifiers, to thereby identify items of video corresponding to topical subjects of interest to said consumer; and
   presenting information to the consumer relating to video items of interest to said consumer.

9. The method of claim 8 wherein said unique identifier changes during the course of a single video program, so that a single video program yields a series of unique identifiers.

10. A method comprising the acts:

receiving information identifying plural topical subjects of interest to a consumer;

processing a feed of video content, said processing including discerning a unique identifier that changes during the course of said video feed, the discerning thereby yielding a series of unique identifiers;

checking said series of unique identifiers in a data store that associates unique identifiers with one or more topical descriptors related to the video identified by said identifiers, to thereby identify items of video corresponding to topical subjects of interest to said consumer; and presenting information to the consumer relating to video items of interest to said consumer;

wherein said discerning comprises extracting digital watermark data from picture data to be rendered to a consumer.

* * * * *